(12) United States Patent
Jensen et al.

(10) Patent No.: US 6,640,310 B2
(45) Date of Patent: *Oct. 28, 2003

(54) CLOCK SYSTEM FOR MULTIPLE COMPONENT SYSTEM

(75) Inventors: Rune Hartung Jensen, Sunnyvale, CA (US); Thomas O'Dwyer, Sunnyvale, CA (US); Michael Gartlan, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/176,209

(22) Filed: Jun. 20, 2002

(65) Prior Publication Data

US 2002/0157032 A1 Oct. 24, 2002

Related U.S. Application Data

(63) Continuation of application No. 09/316,983, filed on May 24, 1999.

(51) Int. Cl.[7] ................................................. G06F 1/06
(52) U.S. Cl. ..................... 713/500; 713/400; 713/600; 710/61; 710/118; 709/400
(58) Field of Search ..................... 713/500, 400, 713/401, 501, 502, 503, 600, 601; 709/400; 710/58, 61, 117, 118, 124

(56) References Cited

U.S. PATENT DOCUMENTS

| | | | | |
|---|---|---|---|---|
| 3,600,700 A | * | 8/1971 | Matsuo | 331/12 |
| 5,150,068 A | * | 9/1992 | Kawashima et al. | 328/155 |
| 5,341,031 A | * | 8/1994 | Kinoshita et al. | 307/269 |
| 5,428,764 A | * | 6/1995 | Maskas | 713/400 |
| 5,712,883 A | * | 1/1998 | Miller et al. | 375/371 |
| 5,719,511 A | * | 2/1998 | Le Cornec et al. | 327/146 |
| 5,802,132 A | * | 9/1998 | Pathikonda et al. | 377/48 |
| 6,434,706 B1 | * | 8/2002 | Jensen et al. | 713/500 |

* cited by examiner

*Primary Examiner*—Jeffrey Gaffin
*Assistant Examiner*—Rijue Mai
(74) *Attorney, Agent, or Firm*—Aaron Waxler

(57) ABSTRACT

A clock module operates in conjunction with the generation of the bus-clock signal to provide a combination of module-clocks that can be relied upon to provide an adequate safety margin for data transfers among processing modules at the speed of the bus-clock. In a preferred embodiment, a system-clock generates the bus-clock and a sample-clock, the sample-clock having a predetermined phase relationship with respect to the bus-clock. Base-clocks at each of the frequencies required for each processing module are generated in the conventional manner, and, in accordance with this invention, are sampled by the sample-clock to produce sampled module-clocks that are provided to each corresponding processing module. By sampling each base-clock with a sample-clock that has a corresponding predetermined phase relationship with respect to the bus-clock, each module-clock will have a predetermined phase relationship with respect to the bus-clock. By selecting the predetermined phase relationship appropriately, an optimal data transfer speed can be achieved.

12 Claims, 4 Drawing Sheets

CLOCK SYSTEM FOR MULTIPLE COMPONENT SYSTEM

This is a continuation of application Ser. No. 09/316,983 filed May 24, 1999.

BACKGROUND OF THE INVENTION

1. Field of the Invention

This invention relates to the field of electronic systems, and in particular to systems comprising components having multiple clocked components or modules.

2. Description of Related Art

Large scale systems often contain multiple components that communicate via a common bus. In a conventional common bus system, a bus-clock is provided to synchronize the communications among the modules. That is, reliable bus communications among modules requires that the data being communicated is stable at the times when the communication is to actually occur. The bus-clock identifies these stable communication times. Conventionally, a module writes its data to the bus sufficiently ahead of the communication time so that it is stable when the communication time occurs, and a module reads the data from the bus when the communication time occurs, as identified by a bus-clock transition.

Due to propagation delays, component delays, and the like, the actual time that a module reads the data will not coincide exactly with the time that the bus-clock transition occurs, and therefore the writing module must maintain the stability of the data within some specified tolerance band before and after the transition, and no other module may initiate a write to the bus, for example, in anticipation of the next bus-clock transition, within this specified tolerance band. Each module that reads data from the bus must effect its read operation within this tolerance band.

In general, the width of the tolerance band before and after the bus-clock transitions limits the speed at which the bus-clock transitions can occur, and therefore limits the achievable data transfer rate via the bus. Narrowing the tolerance band, however, requires tighter design and fabrication rules to assure that modules conform to the tighter limits, and therefore increase the cost of the modules. In a typical design, the ever increasing demand for higher system performance forces the bus-clock speed to "push the limit", allowing for as little tolerance as possible to achieve the highest speed possible. Because the actual propagation delays, component delays, and the like are not determinable until after the effects of the actual placement and routing of each module on a chip or board are determined, the modules are typically iteratively designed and redesigned to assure that the data is read from or written to the bus at precisely the right time. That is, each module's clock is adjusted or redesigned so that it is synchronous in phase with the bus-clock at its particular location on the chip or board, with its particular routing path and associated delay parameters. This iterative design process is costly, and often results in significant program schedule slippage as the interactions of each of the modules and each of the design or layout changes produce an increasingly difficult set of design and timing tradeoffs and constraints.

To reduce the likelihood of an iterative design process, alternative techniques have been developed to increase the likelihood of conforming to tight clock tolerance requirements. A common technique is the use of self-synchronizing design techniques. For example, to assure that the input or output of a module remains synchronous to the bus-clock regardless of the placement of the module on the chip or board, the module can include a Phase-Locked-Loop (PLL), which, as its name implies, locks the phase of the module's data transfer clock to the phase of the bus-clock. That is, rather than physically adjusting each module's clock to match the phase of the bus-clock, the PLL effects this matching electronically and automatically. Because the layout parameters of each module affect each module's phase relationship with the bus-clock, each module in this alternative must include a PLL to effect an accurate phase matching.

Although the use of self-synchronizing modules substantially reduces the number of design iterations required, there are additional costs associated with adding a PLL circuit to each module. These costs include the additional cost of the components used, the additional cost of testing each PLL, the consumption of area on the chip or board to accommodate each PLL, and the like. Addition, conventional PLLs include analog components, which, as is known in the art, are inherently more difficult and costly to design and fabricate than digital components, and which do not scale as easily to newer technologies as digital components. Also, each PLL consumes a significant amount of power compared to digital components.

BRIEF SUMMARY OF THE INVENTION

It is an object of this invention to provide a clock architecture that provides for a reliable and robust bus-system interface. It is another object of this invention to provide a clock architecture that is modular. It is another object of this invention to provide a clock architecture that is scalable. It is another object of this invention to provide a clock architecture that is easy to test. It is another object of this invention to provide a clock architecture that reduces the complexity associated with system tests. It is another object of this invention to provide a clock architecture that consumes substantially less power than a PLL based design.

These objects, and others, are achieved by providing a clock module that operates in conjunction with the generation of the bus-clock signal to provide a combination of module-clocks that can be relied upon to provide an adequate safety margin for data transfers among processing modules at the speed of the bus-clock. In a preferred embodiment, a master-clock generates the bus-clock and a sample-clock, the sample-clock having a predetermined phase relationship with respect to the bus-clock. Base-clocks at each of the frequencies required for each processing module are generated in the conventional manner, and, in accordance with this invention, are sampled by the sample-clock to produce sampled module-clocks that are provided to each corresponding processing module. By sampling each base-clock with a sample-clock that has a corresponding predetermined phase relationship with respect to the bus-clock, each module-clock will have a predetermined phase relationship with respect to the bus-clock. By selecting the predetermined phase relationship appropriately, an optimal data transfer speed can be achieved.

BRIEF DESCRIPTION OF THE DRAWINGS

The invention is explained in further detail, and by way of example, with reference to the accompanying drawings wherein.

DETAILED DESCRIPTION OF THE INVENTION

Figure 1:
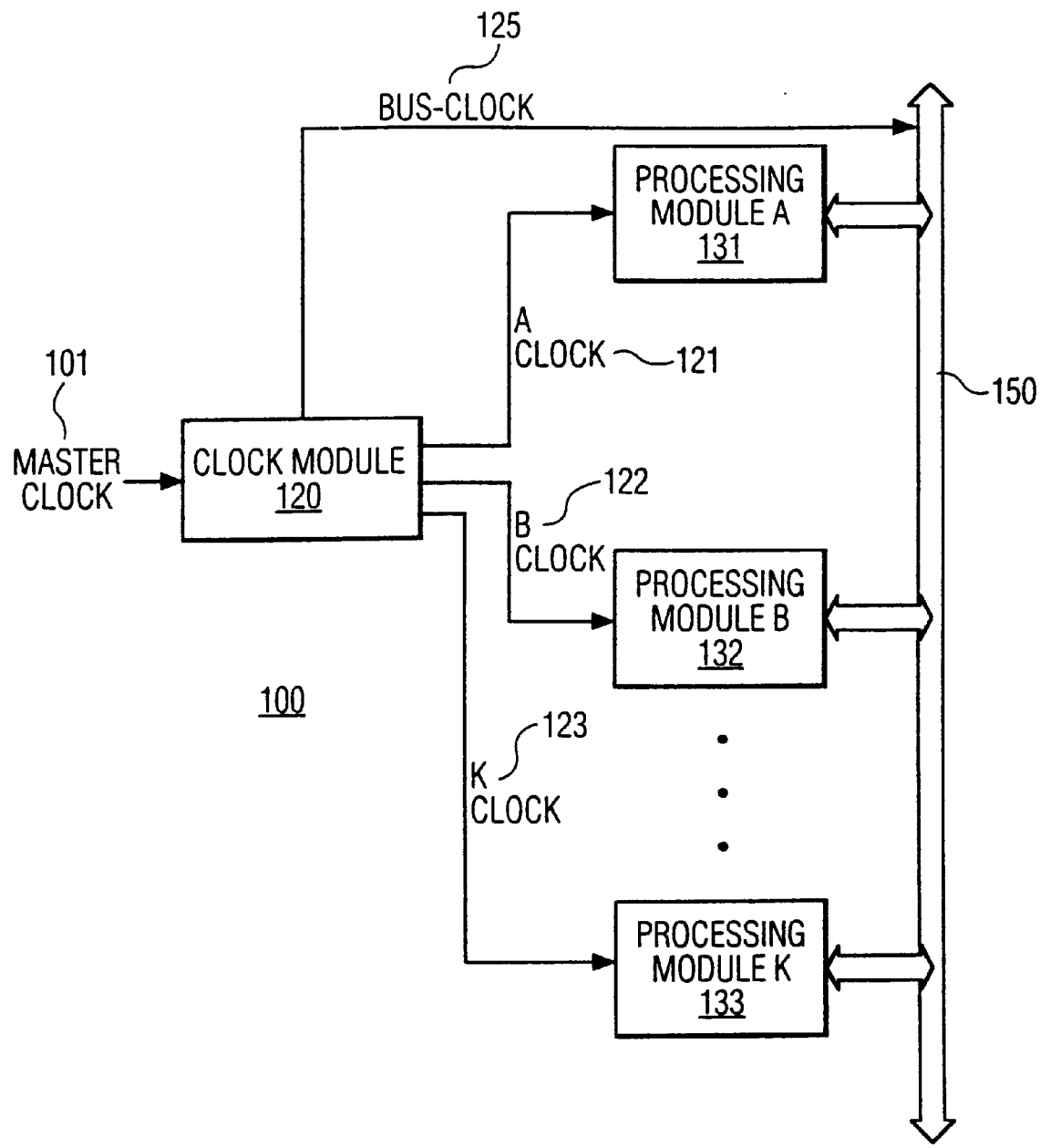
FIG. 1 illustrates an example block diagram of a processing system having a clock module in accordance with this invention.

FIG. 1 illustrates an example block diagram of a processing system 100 having a clock module 120 in accordance with this invention. In addition to the clock module 120, the processing system 100 comprises one or more processing modules 131–133 that communicate with each other via a common bus 150.

The processing modules 131–133 are used herein as paradigms for devices that perform some function in dependence upon a clocking signal 121–123, respectively, and which communicate with each other, and potentially with other devices, via the common bus 150. The processing module, for example, may be a state machine that responds to input data from the bus 150, and produces output data to the bus 150; it may be a printer controller that initiates a sequence of commands to effect the printing of characters or images that are communicated to it via the bus 150; it may be a CD player controller that reads the contents of a currently loaded disk and present the contents to the bus 150 for subsequent printout by the aforementioned printer controller; and so on.

The clock module 120 provides the necessary module-clock signals 121–123 for each of the processing modules 131–133. In accordance with one aspect of this invention, the clock module 120 also provides the common bus-clock signal 125. The clock module 120 provides these module-clock signals 121–123 and bus-clock signal 125 based upon a master-clock signal 101, to facilitate synchronization and other time related operations. In accordance with this invention, each module-clock signal 121–123 has a predetermined phase relationship with the bus-clock 125.

Figure 2:
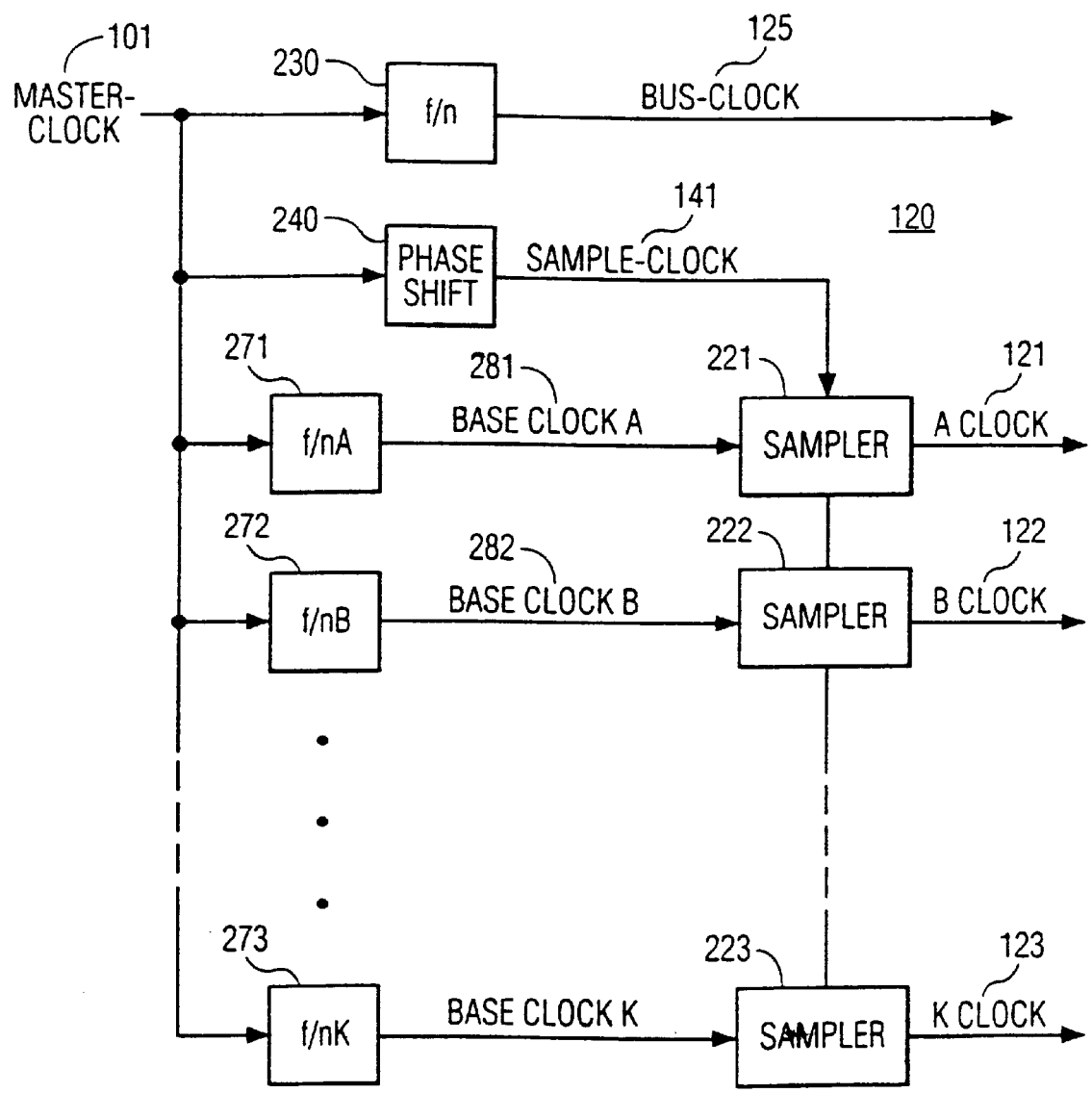
FIG. 2 illustrates an example block diagram of a clock module in accordance with this invention.

FIG. 2 illustrates an example block diagram of a clock module 120 in accordance with this invention. The example clock module 120 generates the module-clock signals A-clock 121, B-clock 122, and K-clock 123 that have a predetermined phased relationship with the bus-clock signal 125. The predetermined phase, as will be discussed further herein, is determined to provide a safety margin between the transitions of the data being placed on the bus 150 from the modules 131–133 and the transitions of the bus-clock 125 that control the data transfer on the bus 150. Providing the predetermined phase relationship in the example clock-module 120 is effected by sampling, via samplers 221–223, corresponding base-clock signals 281–283 with a sample-clock 241 that also has a predetermined phase relationship with the bus-clock 125. The sample-clock 241 is derived from a master clock signal that has a frequency which is "n" times the frequency of the bus-clock 125, where n is an integer. In the example embodiment of FIG. 2, the bus-clock 125 is derived from this master clock signal, via the f/n frequency divider 230. In this manner, the phase shift of the sample-clock 241 that is introduced by the phase shift module 240 relative to the master clock is also the phase shift of the sample-clock 241 relative to the bus-clock 125. Alternative arrangements for providing a signal that has a fixed phase relationship to another signal are commonly known in the art.

The base-clock signals 281–283 are the clock signals that are required by the corresponding processing modules, each processing module having a potentially different requirement. The particular frequency of each base-clock signal 281–283 is defined using techniques common to the art of system design. Conventionally, the frequency of each base-clock signal is an integer fraction of frequency of the bus-clock 125, to avoid a changing phase relationship among modules. For example, one processing module may be configured to operate at one third the frequency of the bus-clock, another at one half, and yet another at the same frequency as the bus-clock. These integer fractions (nA, nB, nK) are illustrated in the example of FIG. 2 by the frequency dividers 271–273 that produce the base-clock signals 281–283, wherein n is the integer divisor that provides the bus-clock frequency, and A, B, and K are integer divisors that provide each module clock frequency relative to the bus-clock. Alternative arrangements for providing each base-clock signal 281–283 having a fixed frequency relationship to the bus-clock 125 are commonly known in the art.

Figure 3:
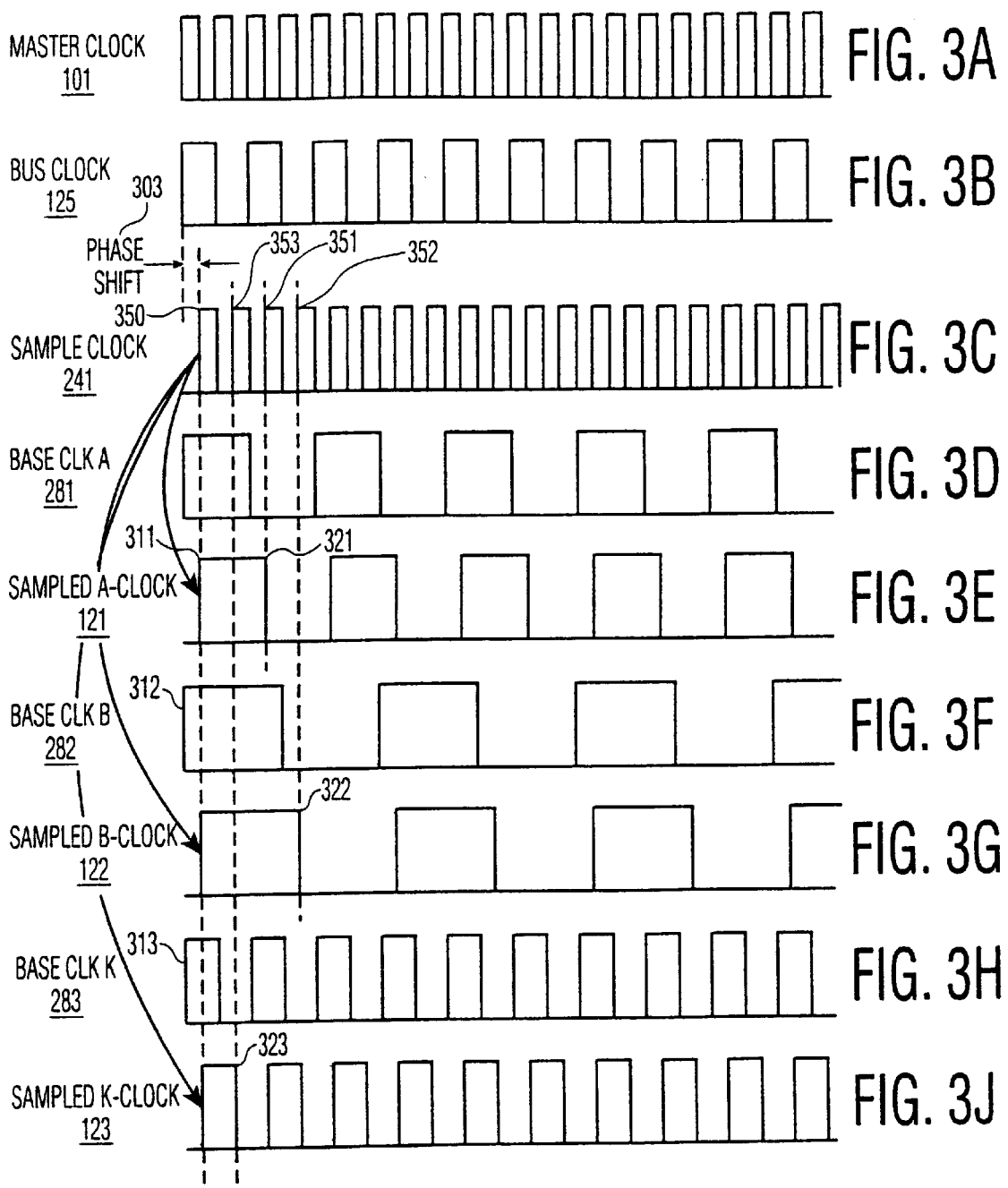
FIG. 3 illustrates an example timing diagram of a processing system in accordance with this invention.

FIG. 3 is an example timing diagram that illustrates the effects of this sampling process on the base-clock signals 281–283. As illustrated on line 3C, the sample-clock 241 is phase shifted 303 relative to the bus-clock 125 that is illustrated on line 3B. Illustrated on lines 3D, 3F, and 3H, are the base-clock signals 281, 282, and 283, which are not at the desired predetermined phase relationship to the bus clock 125. In the example of FIGS. 2 and 3, the base-clock signals 281–283 are illustrated as having the same phase relationship with each other and with the bus-clock 150, although, as will be evident to one of ordinary skill in the art in view of this invention, the phase of each of the base-clock signals 281–283 relative to the bus-clock 125 need only be less than the aforementioned predetermined phase.

Illustrated on lines 3E, 3G, and 3J are the resultant sampled module-clock signals 121–123 respectively. As can be seen, the rising edge 311–313 of the module-clock signals 121–123 correspond to a rising edge 350 of the sample clock 241, and the falling edge 321–323 of the module-clock signals 121–123 also correspond to a rising edge 351–353 of the sample-clock 241, respectively. Thus, because the active edges of the sample-clock 241 occur at a predetermined phase 303 relative to the bus-clock 125, transitions of the sampled clock signals 121–123 occur at a predetermined phase relative to the bus-clock 125. The difference between the predetermined phase 303 of the sample-clock 241 and the predetermined phase of each sampled clock signal 121–123 is the phase shift that is introduced by each sampler 221–223, which is minimal in a preferred embodiment. For example, the sampler 221–223 may be a conventional flip-flop having the base-clock signal 281–283 as input, that is edge triggered by the sample-clock 241. For ease of reference and understanding, hereinafter the phase shift introduced by each sampler 221–223 will be considered equal and substantially zero, and thus the predetermined phase shift of each sampled clock signal 121–123 is substantially equal to the predetermined phase shift 303 of the sample-clock 241, as illustrated in FIG. 3.

The predetermined phase shift 303 can be determined using timing analysis techniques common in the art. To assure reliable operation, an estimated skew of each clock signal 121–123 from the clock module 120 to its corresponding processing module 131–133 is determined based on estimated propagation delays. To this estimated skew is added the required phase shift between the clock signal 121–123 and the bus-clock 125, based on the characteristics of the data transfer devices in the corresponding processing module 131–133 used to access the bus 150, or based on a general specification related to all devices that access the bus 150, to provide a total phase shift associated with each clock signal 121–123. In a preferred embodiment, the predetermined phase 303 of the sample-clock 241 is determined to be the maximum of the total phase shift associated with each clock signal 121–123 plus a safety margin. As is common in the art, the choice of a safety margin is dependent upon a variety of factors. Often these factors are design constraints which determine the predetermined phase 303, from which the safety margin is computed (predetermined phase 303 minus the maximum of the total phase shift of each clock signal 121–123). For example, if a design constraint is minimal cost, the phase shift module 240 may be a simple inverter, which provides a fixed phase shift that is substantially equal to 180 degrees. In like manner, the frequency of the bus-clock 125 may be a predetermined frequency based on an interface requirement to higher level systems, or based on compliance with an industry standard. If, given such system design constraints, the determined safety margin fails to satisfy an individual or corporate goal or criteria, the design constraints are reassessed, design changes or requirements changes are made, and the safety margin is recomputed and assessed. Although this process may be iteratively repeated until an appropriate safety margin is achieved, it can be performed well in advance of, and at significantly less cost than, a layout or fabrication of the completed design, as often occurs using conventional module clock design techniques.

As illustrated by the example block diagram of FIG. 2, a clock module 120 in accordance with this invention can be implemented using digital frequency dividers 271–273 and samplers 221–223, thereby obviating the need for an analog PLL circuit associated with each processing module 131–133, as discussed above with regard to prior art systems. Note also that the phase shift module 240 in a preferred embodiment is also implemented using only digital logic, such as the aforementioned inverter that provides a 180 degree phase shift, or, if the master clock is more than twice the bus-clock frequency, a ring-shift register that provides a selection of discrete submultiples of the bus-clock period. These and other techniques for providing a phase shift via digital devices are common in the art. Using such techniques, the entire clock module 120 can be implemented using digital devices, thereby eliminating the costs, power consumption, and other complexities associated with the conventional use of analog devices for clock generation and synchronization.

Figure 4:
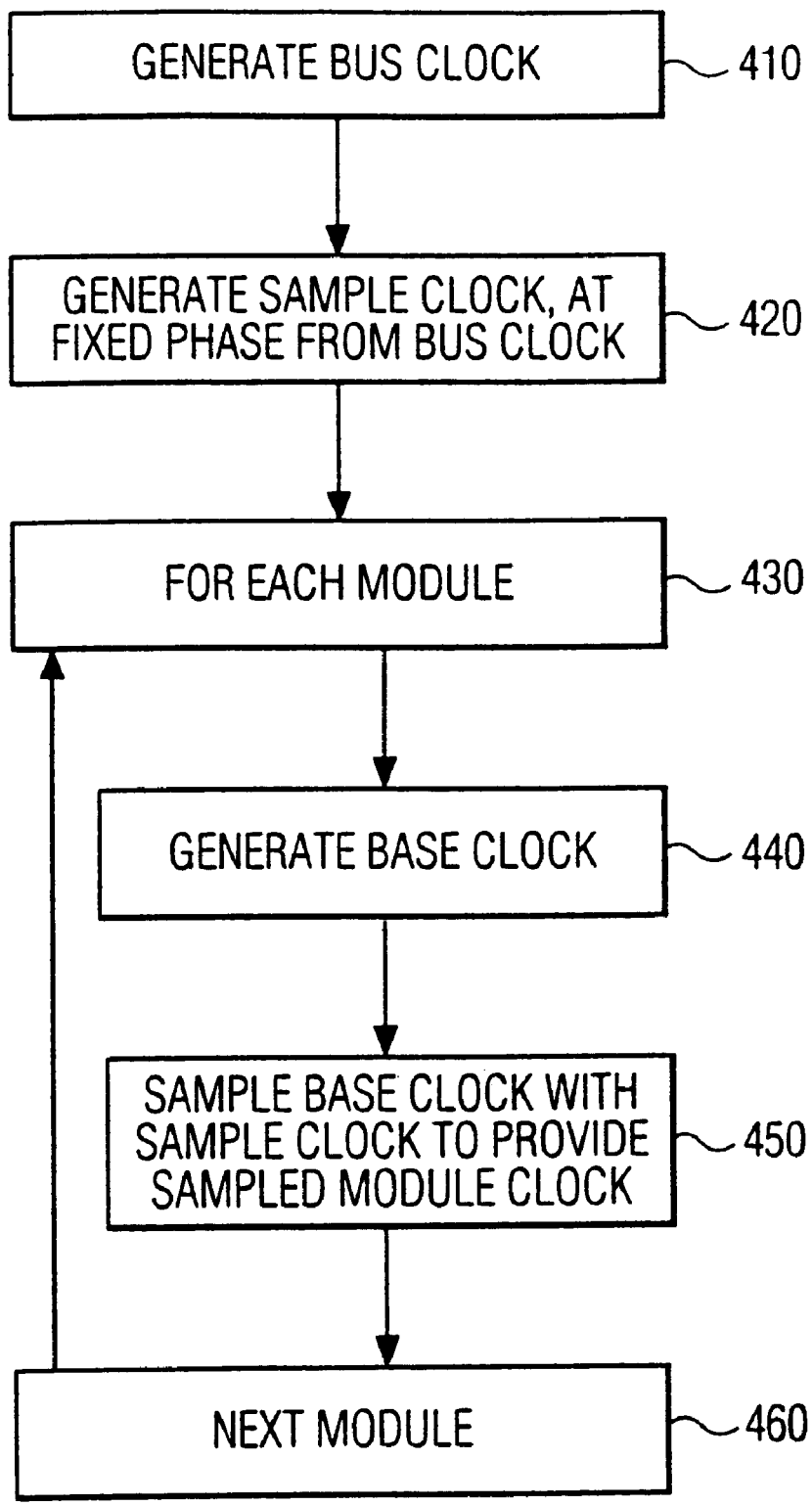
FIG. 4 illustrates an example flow diagram of a clock module for a processing system in accordance with this invention.

The foregoing merely illustrates the principles of the invention. It will thus be appreciated that those skilled in the art will be able to devise various arrangements which, although not explicitly described or shown herein, embody the principles of the invention and are thus within its spirit and scope. FIG. 4 illustrates an example flow diagram for generating clock signals in accordance with this invention, as might be employed in the example clock module 120 of the processing system 100, and will be used to illustrate a few example alternative arrangements. At 410, the bus-clock is generated, using for example the frequency divider 230 of FIG. 2, and at 420 the sample-clock is generated at a fixed phase from the bus-clock. Alternatively, an external source may provide the bus-clock, in which case the sample-clock would be synchronized to this externally provided bus-clock, at the predetermined fixed phase, using synchronization techniques common in the art. The loop 430–460 effects the generation 440 of each base-clock and the sampling 450 of this base-clock, using for example the frequency dividers 271–273 and sampleers 221–223 of FIG. 2. Alternatively, one or more of the base-clocks may be generated externally, for example, at the corresponding processing module. Provided that care is taken to keep the externally generated base-clocks within some large tolerance of synchronization with the bus-clock, for example, at any phase larger than 0 and less than the predetermined phase of the sample-clock, the corresponding sampler will provide a sampled module-clock that is precisely phased with the bus-clock. Also alternatively, multiple sample clocks may be employed to provide differing predetermined phases to one or more of the processing modules. For example, devices that read data from the bus may be provided clock signals having one predetermined phase delay, devices that write data to the bus provided clock signals having an other predetermined phase delay, and devices that read and write data provided both clock signals, or another clock signal having a third predetermined phase, and so on.

The particular configurations and structures are provided in the figures for illustration only. Alternative configurations, such as the incorporation of the clock module 120 within one of the processing modules 131–133 would be evident to one of ordinary skill in the art. The functional blocks may be implemented in hardware, software, or a combination of both. For example, the functions of the frequency dividers 271–273 may be embodied in programming code that is executed in an embedded processor, or programming code that effects the creation of a programmed logic array that operates as a state machine to effect the required functions, while the samplers 221–223 may be conventional logic gates. These and other system implementation and optimization techniques will be evident to one of ordinary skill in the art in view of this invention, and within the intended scope of the following claims.

We claim:

1. A semiconductor device comprising:
   a processing system comprising:
      a plurality of processing modules, each processing module of the plurality of processing modules being responsive to a module-clock signal and communicates data via a bus in dependence upon a bus-clock signal, and
      a clock module that includes
         a phase shifter that provides a sample-clock signal having a fixed phase relative to the bus-clock signal,
         a plurality of clock samplers, wherein each clock sampler samples a corresponding base-clock signal in dependence upon the sample-clock signal to produce the module-clock signal for each corresponding processing module, the module-clock signal having a predetermined phase relative to the bus-clock signal.

2. The semiconductor device of claim 1, wherein the phase shifter provides the sample-clock signal based on a master-clock signal, the master-clock signal being synchronous with the bus-clock signal.

3. The semiconductor device of claim 2, wherein the clock module further includes a frequency divider that provides the bus-clock signal based on the master-clock signal.

4. The semiconductor device of claim 3, wherein the clock module further includes one or more base frequency dividers that provide one or more of the base-clock signals based on the master-clock signal.

5. The semiconductor device of claim 1, wherein the clock module further includes a frequency divider that provides the bus-clock signal based on a master-clock signal.

6. The semiconductor device of claim 5, wherein the clock module further includes one or more base frequency dividers that provide one or more of the base-clock signals based on the master-clock signal.

7. The semiconductor device of claim 1, wherein the clock module further includes one or more base frequency dividers that provide one or more of the base-clock signals based on a master-clock signal.

8. The semiconductor device of claim 1, wherein the phase shifter comprises at least one of: an inverter, a shift register, a counter, and a state machine.

9. A semiconductor device comprising:
   a clock module that provides a plurality of module-clock signals each having a predetermined phase relative to a bus-clock signal, comprising
      a phase shifter that accepts as input a master-clock signal and produces therefrom a sample-clock signal having the predetermined phase relative to the bus-clock signal, and
      a plurality of samplers, operably coupled to the phase shifter,
         each sampler of the plurality of samplers accepting as input a base-clock signal of one or more base-clock signals and the sample-clock signal and produces therefrom a module-clock signal of the plurality of module-clock signals that is synchronous to the sample-clock signal.

10. The semiconductor device of claim 9, further including a bus-clock frequency divider that accepts as input the master-clock signal and produces therefrom the bus-clock signal.

11. The semiconductor device of claim 9, wherein one or more base-clock frequency dividers that accept as input the master-clock signal and produces therefrom one or more of the one or more base-clock signals.

12. The semiconductor device of claim 9, wherein the phase shifter comprises at least one of: an inverter, a shift register, a counter, and a state machine.

* * * * *